United States Patent [19]

Ponce

[11] Patent Number: 5,198,107

[45] Date of Patent: Mar. 30, 1993

[54] FILTERS FOR HEAVY DUTY INTERNAL COMBUSTION ENGINES

[76] Inventor: Jose A. G. Ponce, Enrique Wallon 417, 11580 Mexico, D.F., Mexico

[21] Appl. No.: 799,025

[22] Filed: Nov. 25, 1991

Related U.S. Application Data

[63] Continuation of Ser. No. 536,407, Jun. 11, 1990, abandoned.

[51] Int. Cl.⁵ .............................................. B01D 27/06
[52] U.S. Cl. .................................... 210/232; 210/338; 210/342; 210/450; 210/457; 210/484; 210/493.2; 210/504
[58] Field of Search ...................... 210/232, 323.2, 335, 210/338, 339, 342, 450, 493.1, 497.01, 503, 437, 453, 484, 487, 489, 493.2, 493.5, 315, 457, 504, 505

[56] References Cited

U.S. PATENT DOCUMENTS

| | | | |
|---|---|---|---|
| 2,008,892 | 7/1935 | Asplund | 162/17 |
| 3,361,260 | 1/1968 | Buckman | 210/315 |
| 3,368,687 | 2/1968 | Ruschman | 210/493.1 |
| 3,370,708 | 2/1968 | Hultgren et al. | 210/315 |
| 3,827,566 | 8/1974 | Ponce | 210/388 |
| 4,455,195 | 6/1984 | Kinsley | 210/504 |
| 4,455,237 | 6/1984 | Kinsley | 210/504 |
| 4,655,939 | 4/1987 | Moser | 210/503 |

FOREIGN PATENT DOCUMENTS 856494 9/1981 U.S.S.R. ........................ 210/493.5

*Primary Examiner*—Robert A. Dawson
*Assistant Examiner*—Matthew O. Savage
*Attorney, Agent, or Firm*—Roylance, Abrams, Betdo & Goodman

[57] ABSTRACT

An oil filter for use in heavy duty internal combustion engines is disclosed herein. The oil filter includes an exterior tube with perforations, an interior tube with perforations, a spring located inside the interior tube, a lower and an upper end cap attached to first and second ends of the exterior and interior perforated tubes, respectively, and two pleated layers of filter media concentrically located between the interior and exterior perforated tubes without any stabilizing means located between the layers of filter media. The two layers of filter media are formed of a substantial portion of pulp of fibers that contain lignin to reduce softening and swelling of the filter media upon contact with water.

14 Claims, 3 Drawing Sheets

FILTERS FOR HEAVY DUTY INTERNAL COMBUSTION ENGINES

This is a continuation of application Ser. No. 07/536,407 filed Jun. 11, 1990, now abandoned.

FIELD OF THE INVENTION

This invention is related to an improved filter for heavy duty internal combustion engines, with a structure that includes a filtering device with outstanding characteristics, as well as a packing that provides perfect sealing between the filter and the exit connection, even when this has different diameters.

BACKGROUND OF THE INVENTION

At present, filters used in internal combustion engines suffer from a multitude of deficiencies, the most important being: their low filtering capacity and low yield, since the filtering element is quickly saturated with sediment and dirt contained in the element being filtered. On the other hand, the large amount of the element subject to filtering which leaks through the exit connection of filters without having contact with the filtering element, thus causing filtration deficiency.

Filters used in heavy duty internal combustion engines are generally placed in a hollow cylinder that has a cap on the upper part, an entrance conduit for the element to be filtered and a conduit placed on the lower part that allows the element for filtration to exit once it has passed through the filter.

Now, therefore, when the element for filtration penetrates inside the above-mentioned hollow cylinder, which for brevity of the term we will hereinafter call "filter box", and is submitted to a determined pressure and will therefore try to exit by the point of least resistance, that is, the element subject to filtration will have basically two paths to follow:

The first will be by passing through the filter until reaching the central, hollow part of it, to exit via the exit conduit of the above-mentioned filter box, thus performing perfect filtration.

The second path whereby the element to be filtered can exit will be without passing through the filter, since logically this represents greater resistance; this exit path which the element subject to filtration will have will be by the point where the filter makes contact with the exit connection of the filter box.

Having established the foregoing, at present, at the point where the filter connects with the exit conduit of the filter box there is no packing that makes a perfect seal, which results in leaks and consequently, deficient filtration.

The above problem is worsened inasmuch as filter boxes do not have an exit conduit with a standard diameter, but on the contrary, these exit conduits have different diameters and what is more, some internal combustion engine filter boxes simply are manufactured without a guide in the exit conduit.

As regards the filtering medium used in filters for heavy duty internal combustion engines, they must meet certain physical and chemical characteristics in order to operate adequately and overcome the often found problem with water that is introduced into the lubricating oil. The problem of water in the lubricating oil, for example that used in locomotives, is very common and causes serious problems if an appropriate lubricating oil filter is not used in the engine of the locomotive. The result of using an inappropriate filter is that the water softens and swells the filter, the filter becomes weakened and the edge of the bottom of the fold extrudes inside the central filter pipe, thus causing blockage of the line or at least a reduction in the flow rate, that is, a high pressure drop. In order to test the filter materials to determine if they will be appropriate for use in locomotive engines, a water extrusion resistance test has been formulated with the aim of testing it in the filter medium. In the test, first the flow-resistance of the filter paper to the lubricating oil is tested at a certain temperature and flow rate. Then, the paper is tested as to flow resistance against a water in oil emulsion (generally around 1% water in an oil emulsion), at the same temperature and flow rate. A ratio of the respective pressures measured, that is, the pressure $\times$ gpm of emulsion/pressure to $\times$ gpm of lubricating oil is indicative of an adequate form of the filter means. The industry generally considers that when it is greater than 1.1, it is inadequate for application in locomotive lubricating oil filters.

Because the problem of water often appears in locomotive lubricating oil, until now the industry has adopted the use of a paper filter with a covering on one side of cotton down fibers. The filter used is essentially that described in the U.S. Pat. No. 3,116,245 issued to Robert W. McNabb and Howard L. Dahlstrom. The use of cotton down fibers results in a filter means that exhibits good resistance to the extrusion of water and good filtering characteristics. The problem with using cotton as a source, however, is the cyclical variance in supply. Even though cotton is available, the price is prohibitive, that is, $1200US/ton, in comparison with other wood pulps such as "Kraft" wood pulps, whose average price is $300US/ton. The use of Kraft pulp in the filter means for application in filtering locomotive lubricating oil is inadequate; however, since the filter means may exhibit poor resistance to water extrusion. In order to provide a filter means that replaces at least to a substantial degree, the cotton that is generally used, it would benefit the industry if the filter means functioned adequately as a locomotive lubricating oil filter, that is, if it exhibited adequate resistance to water extrusion.

SUMMARY OF THE INVENTION

Therefore, it is the purpose of this invention to provide a filter with an improved structure.

Another purpose of this invention is to supply a packing or gasket with several concentric diameters to avoid leaks via the exit connection of the filter box.

Another purpose of this invention is to provide a filtering means to be used in filtering lubricating oil, particularly for locomotives, which includes a substantial portion of fibers other than cotton fibers.

It is still another purpose of this invention to provide such a filter means that exhibits good filtering characteristics and an improved filtering capacity.

It is yet another purpose of this invention to provide that such filter means be much cheaper than the filter made substantially of cotton down fibers.

Another purpose of this invention is to provide a procedure to filter locomotive lubricating oil using such filter means.

These and other purposes, as well as the scope, nature and utilization of the invention will be clear to experts in the subject from the following description and annexed claims.

DESCRIPTION OF THE PREFERRED EMBODIMENT

Figure 1A:
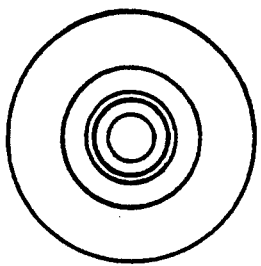
FIG. 1a is an end elevational view of one end of the filter of FIG. 1.
Figure 1:
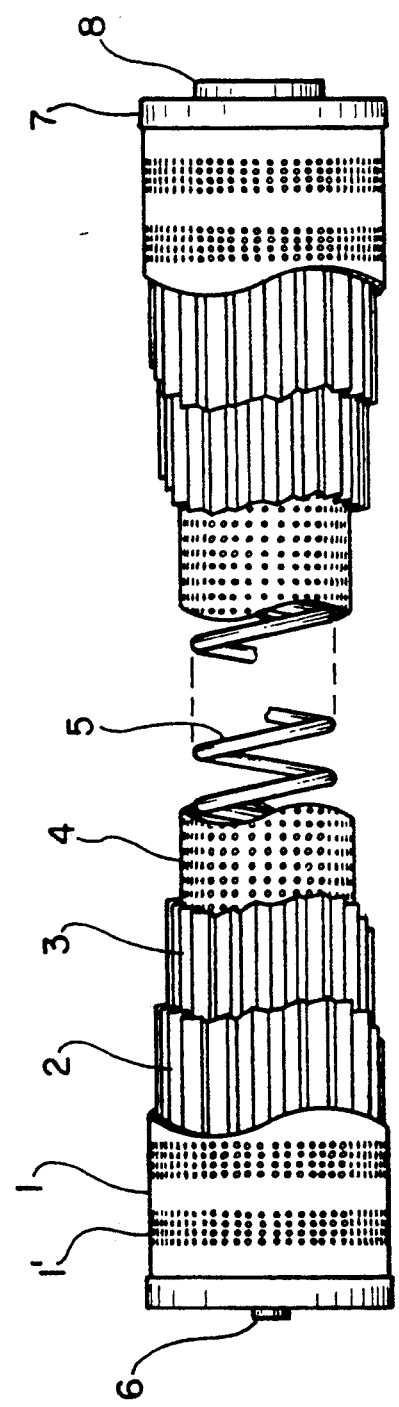
FIG. 1 is a partial side elevational view with portions broken away of the filter in accordance with the present invention.

In order to be able to appreciate the filter which is the object of this invention graphically, in which we have managed to combine and couple two layers of filtering element, a description thereof will be made, referring to the attached sheets of drawings in which:

FIG. 1 shows us a perspective view with different sections that show the different parts forming the filter which is the object of this discovery, in which:

Number 1 shows us the exterior concentric tube, which we could say is the body of the filter, which can be manufactured of any class of material.

Number 1' indicates the perforations in the concentric exterior tube specified by the number 1; such perforations may be of any diameter and be arranged in the most convenient form.

Number 2 indicates the first concentric retention layer, or first layer of filtering element, which in the filter which is the object of this discovery is found inside the tube specified with the number 1.

Figure 6:
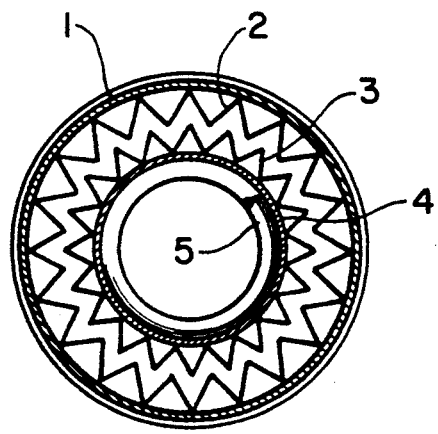
FIG. 6 is a cross-sectional view of the filter.

Number 3 indicates the second concentric retention layer, or second layer of filtering element. As particularly seen in FIG. 2 and FIG. 6, the first concentric retention layer, or first layer of filtering element 2, is radially spaced from the second concentric retention layer, or second layer of filtering element 3, to avoid radial overlapping of the layers of filtering elements 2 and 3.

Number 4 indicates the interior concentric tube which can be manufactured of any class of material and which, in the filter which is the object of this discovery, is found inside the second layer of filtering element indicated with number 3.

The interior concentric tube 4 shows perforations that may be of any diameter and be arranged in the most convenient form.

Number 5 indicates the concentric spring that in the filter which is the object of this discovery is found inside the concentric tube marked with number 4 in order to avoid having the pressure exerted on the filter by the element for filtration binding or crushing the interior concentric tube marked with the number 5.

Number 6 indicates the upper cap of the filter which is the object of this discovery, which may be manufactured with any class of material; this upper filter cap may be closed entirely or have a central perforation.

Number 7 indicates the lower cap of the filter and no. 8 the seal, gasket or packing of such filter.

Figure 2A:
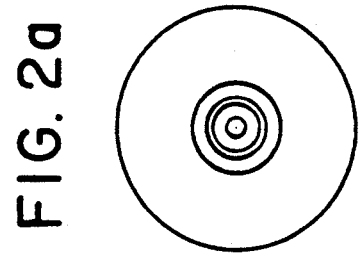
FIG. 2a is an end elevational view of one end of the filter of FIG. 2.
Figure 2:
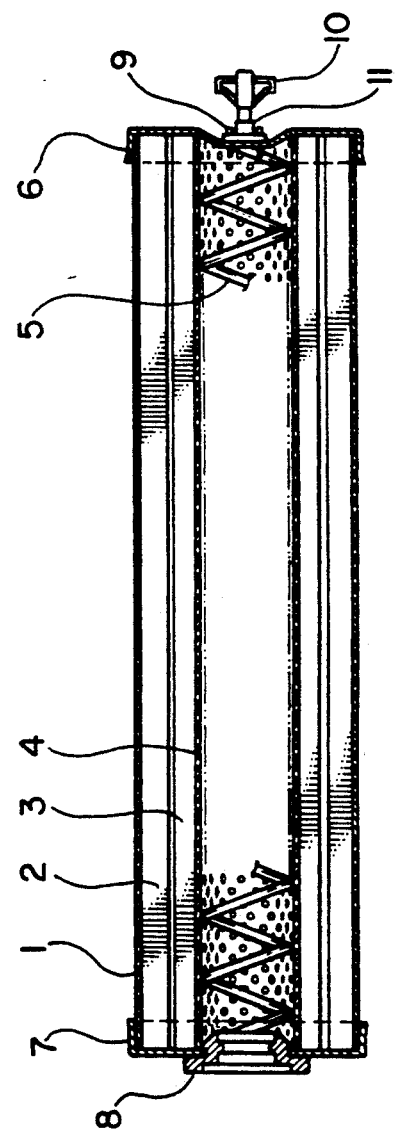
FIG. 2 is a side elevational view in longitudinal section of the filter in accordance with the present invention.
Figure 2B:
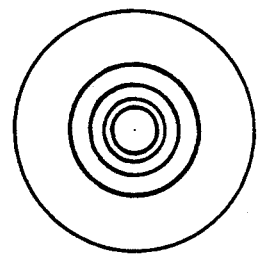
FIG. 2b is an end elevational view of the other end of the filter of FIG. 2.

FIG. 2 is a lateral, transparent section of the filter, object of this discovery, in which all the pieces mentioned in the previous figures are traced; further, a piece appears with no. 9 which is a screw and nut assembly. No. 10 indicates a filter fastening screw which is lodged in the nut specified with no. 11.

Figure 3:
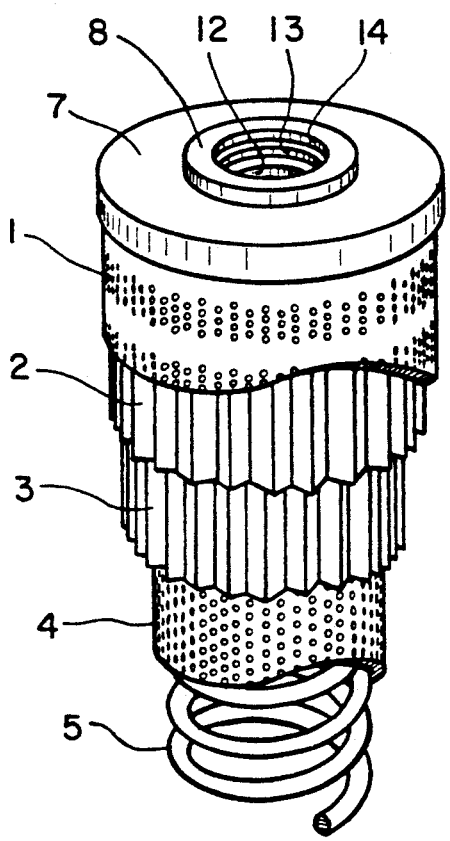
FIG. 3 is a partial perspective view with portions broken away of the filter according to the present invention showing the sealing gasket.

In FIG. 3, no. 1 shows us a filter normally used to filter lubricant in internal combustion engines which has the gasket, object of this discovery, adapted on its lower part.

This gasket, as will be appreciated, has three different concentric sealing diameters, marked respectively with numbers 12, 13 and 14. These three concentric diameters make possible a perfect sealing function between the filter and the exit connection of the filter box, in spite of the fact that the latter has different diameters. Thus, for example, if the exit connection of the filter box has a diameter greater than the interior concentric diameter of the gasket marked with number 12 and less than the interior concentric diameter of the gasket marked with number 13, the sealing will be done by the interior concentric diameter marked with number 12, since because it is of neoprene rubber, it will have sufficient elasticity to expand sufficiently and in this way perform its sealing function.

Thus, successively, we can cite many examples in which we would appreciate that depending on the diameter of the exit connection of the "filter box", the sealing would be done by any of the concentric sealing diameters of the gasket which is the object of this discovery.

Supposing now, that the "filter box" did not have an exit connection or that this had a lesser diameter than the lesser concentric diameter of the neoprene rubber gasket, the sealing would be done with the base of the gasket. The lower cap has sufficient elasticity to seal the filter with the exit connection of the filter box in the case when the diameter of the exit connection is greater than any of the interior concentric diameters of the gasket.

Figure 4:
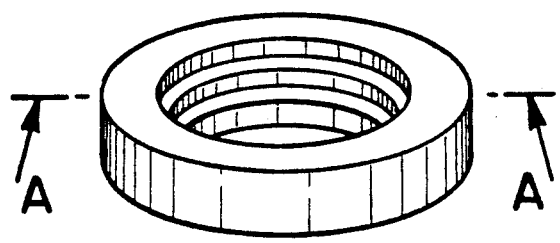
FIG. 4 is a perspective view of the gasket in accordance with the present invention.

FIG. 4 shows us a perspective view of the gasket in which is shown, in a profile projection, the sealing of this discovery which has been modified to include three different interior, concentric sealing diameters.

Figure 5:
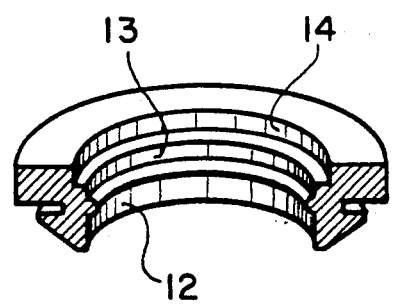
FIG. 5 is perspective view in section of the gasket of FIG. 4 taken along line A—A' of FIG. 4.

FIG. 5 shows us a section view along the A—A' axis of the gasket where we appreciate the three interior concentric sealing diameters.

In the above description, we have shown the preferred embodiments of this discovery, but it must be understood that the discovery can be put into practice by making some modifications to it. For example, the packing can consist not only of two or three or four sealings, but the number of sealings necessary can be used. Likewise, the packing has been described as manufactured of neoprene rubber, but any other adequate material may be used.

As regards the filtering means which forms an integral part of this invention, the filter for lubricating oil particularly for locomotives includes a pulp of fibers that contain lignin. Fibers that contain lignin are derived from the thermo-mechanical formation of pulp from a source of fibers that has a lignin content of at least 10 percent, with pressure conditions of some 3.5 to 8.4 kg/cm$^2$ at a temperature of 149°–176.5° C. and a refinery energy utilization in the margin of 8 to 35 horsepower-day/air dry ton of raw material (HPD/ADT). The resulting fibers that contain lignin are characterized by having the majority of their original content of lignin and with a smooth wall structure, substantially free of superficial fibrils that join with the fiber and substantially do not self-adhere to similar adjacent fibers in the absence of high temperatures.

Using a filter means comprised of a substantial portion of pulp of fibers that contain lignin, in accordance with this invention, the severe problem of swelling and obturation due to water in the lubricating oil is obvious. Likewise, the use of pulp of fibers that contain lignin in accordance with this invention also results in a filter means that exhibits an improved filtering capacity and good filtration. Further, one has the advantage of a cheaper filter.

The pulp of fibers that contain lignin can be used in combination with other adequate pulps, for example, pulps with a high alfa-cellulose or cotton down content. It is generally preferred using the pulp of fibers that contain lignin in quantities of at least 30 percent.

The pulp of fibers that contain lignin, used in the locomotive lubricating oil filter of this invention is that obtained by the processes described in the U.S. Pat. Nos. 4,455,195 and 4,455,237, which are expressly incorporated here as a reference. The pulp is produced with selected, controlled thermomechanical conditions. Surprisingly, we have found that the filter means that comprises a substantial portion of, for example, at least 30 percent of such pulp of fibers which contain lignin does not suffer from the problem of swelling or obturation and easily pass the water extrusion resistance test. Therefore, these filter means are advantageously adequate for use in locomotive lubricating oil applications.

The source of fibers that contain lignin is not specifically critical and may be taken from a wide variety of fibers that contain lignin, although, of course, some are in a given manner preferred to others. These sources include peeled wood (both soft and hard varieties) and other materials that contain lignin, such as bamboo, bagasse, certain grasses and straws and the like. For the purposes of this invention, the fiber-forming material must have a lignin content of at least 10% and preferably 15% or more (the majority of pulp woods have a lignin content above 20%). In the present state of development, the preferred fiber source is peeled wood, whether soft or hard woods, from the North or the South, with some preference for soft woods from the North.

After removing the bark, which is not used in the process to obtain the pulp, the pieces of pulp wood are cut into shavings of a size adequate for the thermomechanical process. Conveniently, a typical shaving size is in the range of 0.95 by 1.27 by 1.91 cm with the fibers aligned with the long axis of the shaving. Of course, in any chip-forming process, the size and configuration of the chips is very much haphazard. Nevertheless, the purpose is to look for a typical chip that has a minimum dimension of 0.95 cm and a maximum dimension of 1.91 cm, that can reasonably be approximated in approximate form by sifting the chips using a sifting screen of 2.54 cm maximum and a sifting screen of 0.95 cm minimum.

The sifted chips, typically after cleaning via a conventional washing procedure with water, are reduced to pulp fibers following the general techniques of the U.S. Pat. No. 2,008,892 of Asplund, whose revelation is here included as reference. A first stage in this process is the preheating of the chips by steam, and this is advantageously carried out in a recipient like a horizontal tube digester. The digester, which is a conventional piece of equipment, can have a rotary valve or similar device (also conventional) in the entrance to accomodate the feeding of the wood chips while the recipient is maintained under a superatmospheric steam pressure.

The wood chips, generally of the indicated size, are preheated to a temperature no less than some 149° C. and more conveniently to a temperature in the range of 165° to 176.5° C. approximately. This corresponds to a pressure margin of some 3.5 kg/cm$^2$ up to 8.4 kg/cm$^2$, with the preferred range being some 6.3 to 8.4 kg/cm$^2$. Conveniently the chips are moved progressively via a partially full ($\frac{1}{4}$ to $\frac{1}{2}$) digester while they are stirred continuously. This ensures highly efficient heat transference between the wood chips and the steam and uniform preheating. Typically, a retention time of three minutes inside the horizontal tube digester is adequate and it is believed this takes the interior of the chip to within some 10° of the steam temperature.

The preheated wood chips are ground into pulp fibers in a disc refiner while kept in a pressure steam atmosphere and a substantially dry condition. The grinding is done in a disc refiner of the general class revealed in the above-mentioned Asplund patent. More specifically, a C. E. Bauer No. 418 counter-rotary 91.44 cm disc refiner is a preferred piece of equipment for this aim. This machine uses a pair of 91.44 cm opposing rotary discs arranged in communication with the horizontal tube digester and to receive preheated wood chips from the digester (preferably with the same pressure conditions), in which case, a pressure valve device placed between the digester and the disc refiner is not required.

According to known principles, when the wood chips are submitted to cutting and abrasion by the counter-rotating refining discs, they are submitted to a later heating as a result of the entrance of energy from the crusher. It is known that with certain preheating conditions of the chips and operation of the disc refiner, the lignin content of the chips becomes softened and plastified, allowing easy separation of the individuals fibers with minimum damange and destruction of the fibers. The desired degree of refining is controlled by adjusting the peripheral hollow between the disc refiner. In general, the narrower the hollow, the greater the utilization of energy required to refine the pulp and make it possible for the fibers to emerge from the hollow. Typically, this energy utilization is measured in braking horsepower days per air dry ton (HPD/ADT) of raw material. To produce pulp fibers ideally adequate for the filter means of this inventions, it has been determined that utilization of energy in the disc refiner should not be less than 8 HPD/ADT and not greater than some 35 HPD/ADT. In many cases, achieving the desired energy levels requires adjusting the hollow to the minimum size—substantially with a zero clearance, although for certain woods, such as soft woods from the South, it may be convenient to slightly enlarge the hollow to restrict the energy to some 35 HPD.

After refining, the fibrous pulp is unloaded from the refiner via an adequate blow valve or the like, which makes it possible for the fibrous material to be taken from a pressurized condition to another unpressurized condition.

After the disc refining operation, the pulp fibers are mixed with sufficient water to derive an aqueous paste with 0.5 to 1% of solids, adequate for sifting or screening the fibers. In this aspect, the fibers produced in accordance with the procedures outlined are significantly larger and more rigid than the conventional pulp fibers, and are not easily screened in conventional pulp screens without excessive rejection of good fibers and unnecessary loss of yield. Because of the characteristics of the pulp fiber thus produced, it is convenient to use a rotary type screen that has circumferentially aligned splits (rather than axially, as is more typical). The "Ultrascreen" screen sold by Black-Clawson is effective in the process. This screen, which has a split width of approximately 152 microns, facilitates effective screening of the pulp with a reliable rejection of chips and other foreign material, without excessive rejection of good fibers.

An important economic advantage of the Asplund type pulp forming procedure mentioned above is the extremely high yield of fibers. The fiber yield can be as high as 95% of the dry wood material started with, in comparison with high execution chemical processes for pulp which give a yield as low as 35% usable fibers. To a large extent, this results in the fact that the exit of fibers from the pulp forming process retains substantially all the lignin and semicellulose content of the original source of fibers without forming pulp. Chemical processes, on the other hand, substantially remove the lignin and semicellulose material, resulting in an immediate loss of yield. Further, due to the essentially fragile nature of the resulting fiber product, significant additional losses occur in the entire subsequent process. The presence of lignin and materials related with lignin in the exit of fibers is significantly advantageous in the final filter means, when fiber production has been achieved with the conditions of the above-described process. Thus, with adequate pressure and temperature conditions, the lignin materials are in a plastified state during the refining operation, which not only makes it possible to produce a relatively large, undamaged fiber, but also the resulting fiber is extremely rigid and firm and has a very smooth exterior surface. This structure is exceptionally ideal for use in filter means, since it exhibits exceptionally low adhesion characteristics, and due to its structure which is similar to "uncooked spaghetti", it results in a voluminous, extremely porous means when placed in chance form, as in moist or air placement, for example. Directly related to the high voluminosity feature is the extremely high freedom in the area of 760 and greater. This is equal to or exceeds the freedom of chemical high execution pulps with better quality.

For the purposes of this invention, the filter means contains a substantial portion, that is, at least 30 percent in weight, and preferably at least 40 percent in weight and especially from 40 to 75 percent in weight of a pulp of fibers that contain lignin. The remaining constitution of the filter means, if there is any, can include adequate fibers and/or pulp which do not result in a failure in the water extrusion test, that is, a ratio greater than 1.1 Examples of such adequate pulps are pulps with high alfa-cellulose, such as the "HPZ" Buckeye pulp, XJ pulp of Merciner, Placetate of Merciner and Esparto (which is a bleached pulp of grass). The remaining constitution can also include cotton down fibers if desired, so that the filter means comprises a mixture of a substantial portion of fibers that contain lignin and cotton down fibers, and is within the scope of this invention.

"Kraft" wood pulps may be present in the filter means in lesser amounts, that is, less than 5 to 10 percent in weight, and preferably less than 5 percent in weight. The presence of more than 10 percent in weight of Kraft wood pulp results in a filter means that exhibits insufficient resistance to water extrusion to be used commercially.

In the manufacture of filters for commercial use, typically although not necessarily, the pulp mixture is generally prepared as an aqueous paste, sufficiently beaten to give uniform distribution, and then placed moist over a screen for manufacturing paper. Also typically, the moist belt is dried and then impregnated with an agglutinant resin. Alternatively, the filter device can be produced using air placement techniques.

The resin typically is cured only partially by the belt manufacturer. The final manufacturer of the filter later usually converts the belt material in an accordeon folded configuration, forming quite frequently, a cylinder of accordeon folds, which accommodates a generally radial flow of the lubricating oil that is going to be filtered. In this stage of production, the resin in the belt material can be completely cured to provide relatively permanent hardening to the manufacturer's configuration.

The resulting filter means, in accordance with this invention, exhibits excellent resistance to water extrusion and also provides an economic advantage of a less costly filter means in comparison with the cotton down filters now used in the industry. The cost of the pulp of fibers that contain lignin, used according to this invention, is only some $450US/ton, in comparison with $1200US/ton of the cotton fibers. In addition to the economic advantage, the use of pulp with fibers that contain lignin results in a filter device that exhibits an improved filtering capacity and good filtering efficiency.

The following examples are provided as specific illustrations of this invention. However, it must be understood that the specific details indicated in the examples are merely illustrative and in no way restricting. All the parts and percentages in the examples and the rest of the specification are in weight, unless otherwise specified.

EXAMPLE 1

Manual sheets are manufactured which have the following components:

A:
40% pulp containing lignin
40% HPZ pulp
20% Esparto
B (Comparative):
100% cotton
C (Comparative):
47% pulp of fibers containing lignin
23% Westvaco bleached Kraft hard wood
30% bleached Kraft pulp made of sequoia chips
D:
47% pulp of fibers containing lignin
30% Placetate (bleached alfa pulp made of soft wood fibers)
23% Esparto
E:
47% pulp of fibers containing lignin
25% Placetate
20% Esparto -continued 8% bleached Kraft pu.p made of sequoia chips A water extrusion resistance test was done on each manual sheet in order to prove the applicability of the materials as a locomotive lubricating oil filter device. The operations were done proving first the flow resistance of the manual sheets to lubricating oil at 82° C. in four flow rates that go from 3.785 to 15.14 liters per minute. Then the lubricating oil was taken and mixed with water in a commercial Waring Blender mixer to form a percent of water in oil emulsion. Then the flow resistance of the manual sheets to the emulsion was tested at 82° C. with the same four flow quantities. The flow resistance was inspected in each case, and the results were tabulated in the following Table 1. Table 1 also indicates the water extrusion resistance ratio (pressure at ×gpm of emulsion/pressure at ×gpm of lubricant) as well as the CFM of Frazier.

TABLE No. 1

| Manual Sheet | Water Flow (Extrusion) Resistance | | | | Average ratio | CFM of Frazier |
|---|---|---|---|---|---|---|
| | 1 gpm | 2 gpm | 3 gpm | 4 gpm | | |
| A Oil at 82° C. | 0.1715 kg/cm² | 0.402.5 | 0.679 | 1.015 | | 21 |
| Emulsion at 82° C. | 0.175 | 0.420 | 0.707 | 1.064 | | |
| Ratio | 1.02 | 1.04 | 1.04 | 1.05 | 1.04 | |
| B Oil at 82° C. | 0.217 | 0.448 | 0.791 | 1.197 | | 14 |
| Emulsion at 82° C. | 0.231 | 0.497 | 0.819 | 1.288 | | |
| Ratio | 1.06 | 1.11 | 1.04 | 1.08 | 1.06 | |
| C Oil at 82° C. | 0.196 | 0.427 | 0.742 | 1.128 | | |
| Emulsion at 82° C. | 0.224 | 0.518 | 0.994 | 1.4+ | | |
| Ratio | 1.14 | 1.27 | 1.34 | — | 1.25+ | |
| D Oil at 82° C. | 0.147 | 0.357 | 0.602 | 0.931 | | |
| Emulsion at 82° C. | 0.154 | 0.371 | 0.637 | 0.959 | | |
| Ratio | 1.05 | 1.04 | 1.06 | 1.03 | 1.05 | |
| E Oil at 82° C. | 0.140 | 0.350 | 0.588 | 0.917 | | 26 |
| Emulsion at 82° C. | 0.161 | 0.378 | 0.637 | 1.001 | | |
| Ratio | 1.15 | 1.08 | 1.08 | 1.09 | 1.10 | |

As can be seen from the preceding Table 1, the filter means of this invention has a ratio in the water extrusion resistance test of around 1.1 or less. This is comparable to the water extrusion resistance of the filter means of cotton fibers (Operation B). If in the filter means more than the right amount less of Kraft wood pulp is used, however, the ratio greatly exceeds 1.1 (Operation C).

EXAMPLE 2

The manual sheets A and B were tested as to their filtering capacity in mgms/6.45 cm² and the filtering efficiency using standard test methods in order to compare the filtering capacity and the efficiency of the locomotive lubricating oil filter device of this invention with a convention locomotive lubricating oil filter device made completely of cotton.

The results are tabulated below and it is shown that while the efficiency is comparable, the filtering capacity of the filter means of this invention is greatly improved.

TABLE No. 2

| Manual sheet | A | E |
|---|---|---|
| Capacity (mgms 6.45 cm²) | 55 | 30 |
| Efficiency (%) | 87 | 91.8 |

Although the invention has been described in the preferred embodiments, it will be understood that experts in the material can perform variations and modifications on it. These variations and modifications must be considered within the scope of the following claims.

What is claimed is:

1. A filter used in heavy duty internal combustion engine, comprising: an exterior tube with perforations concentric to an axis of said filter, an interior tube with perforations concentric with said axis, a spring concentric with said axis located inside said interior tube with perforations, a lower cap and an upper cap attached to first and second ends of said interior and exterior tubes, respectively, and two pleated layers of filtering means concentric with said axis and located between said exterior and interior concentric tubes without any stabilizing means extending between said layers and said end caps; said two layers of filtering means being concentric to said axis and radially spaced apart from each other to avoid radial overlapping of said layers of filtering means when viewed in an axial direction; said end caps and said layers of filtering means defining a space therebetween, the portions of said end caps defining said space being imperforate to fluid material, whereby said fluid material flows radially through said exterior tube, each said layers of filtering means and interior tube, said two layers of filtering means being of equal or different porosity and including a substantial portion of pulp of fibers that contain lignin, derived from disc type refining chips of woods that have a lignin content of at least 10 percent, with steam pressures in the range of 6.3 to 8.4 kg/cm² at temperatures between 165° and 176.5° C., and using energy levels in the range of approximately 8 to 35 brake horsepower days/air dry ton of raw material.

2. A filter in accordance with claim 1, wherein said pulp of fibers which contain lignin is present in an amount of around 30 percent or more, in combination with other pulp or fibers, said filter having a ratio of water extrusion resistance of around 1.1 or less.

3. A filter in accordance with claim 2, wherein said other pulp or fibers comprise a pulp with a high alfa-cellulose or cotton down content.

4. A filter in accordance with claim 2, wherein said pulp of fibers which contain lignin is present in an amount of 40 percent or more.

5. A filter in accordance with claim 2, wherein said lower cap comprises a neoprene rubber gasket.

6. A filter in accordance with claim 1, wherein said layers of filtering means include: a) a substantial fraction of a pulp of fibers which contain lignin, derived from rotary disc refining in a substantially dry state of the material which contains lignin, substantially delignified, which has a lignin content of at least 10%; b) said pulp of fibers that contain lignin is combined with other fibers of the paper manufacture type so that the ratio of the water extrusion resistance of the filter is around 1.1 or less, said pulp being placed to form a belt; and c) said belt is impregnated with sufficient agglutinating resin for handling and formation.

7. A filter in accordance with claim 1, wherein in said layers of filtering means, the other fibers derived from a pulp with a high alfa-cellulose or cotton content.

8. A filter in accordance with claim 1, wherein said lower cap of the filter comprises a gasket with at least two different concentric, interior diameters for sealing between the filter and an exit connection of a filter box.

9. A filter in accordance with claim 8, wherein said lower cap has sufficient elasticity to seal the filter with the exit connection of the filter box, when the diameter of the exit connection is greater than any of the interior concentric diameters of the gasket.

10. A filter in accordance with claim 1, wherein said upper cap is coupled to a nut and a screw threaded within said nut for positioning and pressurizing the filter for sealing said lower cap of the filter onto a filter box.

11. A filter in accordance with claim 1, wherein
said lower cap comprises a gasket with at least three different concentric, interior diameters for sealing between the filter and an exit connection of a filter box.

12. A filter in accordance with claim 1, wherein said upper cap has a threaded nut coupled thereto, said nut being coupled to a central portion of said upper end cap, and a screw, said screw being threadedly received in said nut and being axially adjustable for transmitting axial forces to the filter.

13. A filter used in heavy duty internal combustion engines, comprising:

an exterior tube with perforations, said tube being concentric to an axis of said filter;

an interior tube with perforations and concentric to said axis;

a spring located inside said interior tube and concentric to said axis;

a lower cap on one end of said exterior tube and interior tube;

an upper cap on the other end of said exterior tube and interior tube, said upper cap having a nut coupled thereto and a screw threadedly received in said nut for transmitting axial forces to the filter; and two pleated layers of filtering means concentric with said axis and being positioned between said interior and exterior tube without stabilizing means extending between said layers of filtering means and said upper and lower caps for supporting the layers therebetween, said two concentric layers of filtering means being radially spaced apart from each other to avoid radial overlapping of said layers of filtering means when viewed in an axial direction, said upper and lower caps and said layers of filtering means defining a space therebetween, the portion of said caps defining said space being imperforate to fluid material whereby the fluid material to be filtered flows through said exterior tube, filtering means and interior tube.

14. A filter according to claim 13, wherein
said filtering means is porous and includes a substantial portion of pulp of fibers that contain lignin, derived from disc type refining of chips of woods that have a lignin content of at least 10 percent, with steam pressures in the range of 6.3 to 8.4 $kg/cm^2$ at temperatures between 165° and 176.5° C., and using energy levels in the range of approximately 8 to 35 brake horsepower days/air dry ton of raw material.

* * * * *